(12) United States Patent
Yazaki et al.

(10) Patent No.: US 7,607,527 B2
(45) Date of Patent: Oct. 27, 2009

(54) WHEEL CONVEYOR

(75) Inventors: Atsuhiko Yazaki, Shizuoka (JP); Toshitsugu Mizushiri, Shizuoka (JP); Ryo Ando, Shizuoka (JP); Hirotoshi Kikuchi, Shizuoka (JP); Fumio Uematsu, Shizuoka (JP)

(73) Assignee: Yazaki Kako Corporation, Shizuoka (JP)

( * ) Notice: Subject to any disclaimer, the term of this patent is extended or adjusted under 35 U.S.C. 154(b) by 0 days.

(21) Appl. No.: 10/586,673

(22) PCT Filed: Jan. 12, 2005

(86) PCT No.: PCT/JP2005/000222

§ 371 (c)(1),
(2), (4) Date: Sep. 17, 2008

(87) PCT Pub. No.: WO2005/070792

PCT Pub. Date: Aug. 4, 2005

(65) Prior Publication Data

US 2009/0000903 A1   Jan. 1, 2009

(30) Foreign Application Priority Data

Jan. 23, 2004   (JP)   ............................. 2004-015869

(51) Int. Cl.
*B65G 13/00*   (2006.01)
(52) U.S. Cl. ..................... 193/35 R; 193/37; 193/35 TE
(58) Field of Classification Search .................. 198/780; 193/35 R, 37, 35 TE
See application file for complete search history.

(56) References Cited

U.S. PATENT DOCUMENTS 2,593,089 A * 4/1952 Dodge ..................... 193/35 R (Continued)

FOREIGN PATENT DOCUMENTS

JP   4-97709 U   8/1992

(Continued)

*Primary Examiner*—Douglas A Hess
(74) *Attorney, Agent, or Firm*—Birch, Stewart, Kolasch & Birch, LLP

(57) ABSTRACT

The present invention relates to a wheel conveyor constructed by installing a wheel assembly, which includes wheels and support plates arranged on both sides and rotatably supporting axles of the wheels, in a groove of a frame material, the wheel conveyor being easily disassembled and cleaned, provided with a damping function, and also provided with a dust-trapping function.

Wheels have axle pins, and support plates are provided with pin holes. A wheel assembly is constructed by inserting the axle pins into the pin holes to be rotatably supported. The cross-sectional shape of a frame material is formed such that first groove-like portions formed integrally with lip portions support the support plates to be movable in the longitudinal direction. Bottom groove-like portions formed integrally with a bottom wall are formed to splay more than the edges of the lip portions. The two groove-like portions are integrally jointed to each other through a joint portion. The support plates of a plurality of the wheel assemblies are inserted along the first groove-like portions of the frame material, and a plurality of the wheels are arranged in line.

19 Claims, 11 Drawing Sheets

U.S. PATENT DOCUMENTS

| | | | |
|---|---|---|---|
| 3,890,755 A * | 6/1975 | Specht | 52/645 |
| 4,232,774 A * | 11/1980 | Gunti | 193/35 J |
| 4,399,908 A * | 8/1983 | Gunti | 198/789 |
| 4,815,588 A * | 3/1989 | Katsuragi et al. | 198/781.04 |
| 5,372,247 A * | 12/1994 | Nishikawa | 198/780 |
| 5,657,854 A * | 8/1997 | Chen et al. | 198/787 |
| 6,089,385 A * | 7/2000 | Nozawa | 211/59.2 |
| 6,105,746 A * | 8/2000 | Faisant | 193/35 R |
| 6,286,660 B1 * | 9/2001 | Kalm | 198/782 |
| 6,516,933 B1 * | 2/2003 | Ledingham | 193/35 F |
| 6,581,759 B1 * | 6/2003 | Kalm | 198/860.1 |
| 7,204,358 B2 * | 4/2007 | Mueller | 193/35 R |

FOREIGN PATENT DOCUMENTS

| | | |
|---|---|---|
| JP | 5-238527 A | 9/1993 |
| JP | 2002-274642 A | 9/2002 |

\* cited by examiner

WHEEL CONVEYOR

TECHNICAL FIELD

The present invention relates to the technical field of a wheel conveyor constructed of a metal frame material having a substantially groove-like sectional shape which includes an opening in the upper surface portion, uniform in the longitudinal direction, and a plurality of plastic wheels that are rotatably supported in a groove on the frame material and that have outer circumferential surfaces protruding a little above the opening surface. The invention further relates to a wheel conveyor constructed by installing a wheel assembly, which includes wheels and support plates that are arranged on both sides of the wheels and rotatably support the axles of the wheels, in the groove on the frame material, the wheel conveyor being easily disassembled and cleaned, provided with a damping function, and also provided with a dust-trapping function.

BACKGROUND ART

The wheel conveyor, for example, disclosed in the following Document 1 has conventionally been well known. In this wheel conveyor, a plurality of plastic wheels are supported in the groove on a metal frame material having a substantially groove-like sectional shape that includes an opening in an upper surface portion and is uniform in the longitudinal direction, such that the end portions of an axle protruding from both side surfaces are fitted into bearing portions formed by notching the frame material from the upper ends of the sidewall portions in the groove-depth direction into the slit-like shape, to be rotatable and arranged in a line. The outer circumferential surface of the wheel protrudes a little above the opening surface. Document 1: Japanese Design Registration No. 759980

DISCLOSURE OF THE INVENTION

Problems to be Solved by the Invention

The wheel conveyor disclosed in Document 1 has a construction in which the metal frame material, having a substantially groove-like sectional shape, has flanges and lip portions bent into an outward rectangular sectional shape and has the bearing portions formed by notching the flanges and the sidewall portions from the upper ends in the groove-depth direction into slit-like shapes. Therefore, it is quite difficult and bothersome, as well as time-consuming, to clean the flanges and lip portions of the frame material, which are bent into a rectangle, and also to clean the bearing portions.

Furthermore, the end portions of the metal axles, which protrude from both side faces of the plastic wheels, are directly supported by the bearing portions formed in the sidewall portions of the metal frame material, and the tip ends of the axles hit against the inner faces of the lip portions. Accordingly, when the wheels rotate, the metals come into contact with each other and produce metal powder dust and grinding noises, which negatively affects the environment. Dust generation is a particular problem, especially when the conveyor is used in a strict environment, such as a clean room. It is desirable that the conveyor generates no dust and be easy to clean.

In addition, there is neither a buffering function nor a damping function between the metal frame material and the metal axles. As a result, there are problems in that the presence of uneven places or steps during the transfer of an article may cause an impact that may damage the article and generate percussive noise. In short, it can be hardly said that the wheel conveyor has a quiet structure.

Secondly, if made of plastic, the wheel is generally insulative. This means that the wheel easily creates static electricity due to impact and friction created by the transferred items. At the time of transferring an item, such as an electronic part, there is a threat of damage caused by an electrostatic shock, which is a great problem. Needless to say, the generation of an electrostatic shock to the operator who uses the wheel conveyor may also create problems. As static electricity has the property of attracting dust, the wheel is liable to gather dust after being charged with electricity. Therefore, use in an environment where dust has to be kept away is highly problematic.

A first object of the invention is to provide a wheel conveyor constructed by preparing a wheel assembly including wheels and support plates that are arranged on both sides of the wheels and that rotatably support the axles of the wheels, and installing the assembly in a frame material having a substantially groove-like sectional shape. This wheel conveyor covers the case in which wheels form a continuous line in large numbers with a constant pitch and the case where the wheels form a discontinuous line with spaces left in between.

Another object of the invention is to provide a wheel conveyor having a construction that is most convenient for separated collection and recycling at the time of disposal by forming the frame material into a shape and a structure that allow easy cleaning, and by forming an assemblage relation between the wheel assembly and the frame material and a relation between the wheels configuring the wheel assembly and axle pins or that between the axle portions and the support plates such that disassembly and easy cleaning is possible.

Another object of the invention is to provide a wheel conveyor having a construction in which there is neither direct contact nor friction between metals, which eliminates the fear of the generation of metal powder dust and the grinding noise of metal, and the scattering of dust can be suppressed by using a dust-trapping sheet, which makes the conveyor suitable for use in an environment, such as a clean room.

Another object of the invention is to provide a wheel conveyor with buffering and damping functions, in which the presence of uneven surfaces during the transfer of items does not cause an impact that may damage the items carried and produce a percussive noise, to thereby achieve use without noise.

Another object of the invention is to provide a wheel conveyor in which plastic members including the wheels, the support plates, and the like, are made of plastic material possessing electric conductivity or antistatic property, so that even if static electricity is created due to friction against the transferred items, an electrostatic charge would not be generated, thus eliminating the fear of damage caused by an electrostatic shock in the process of transferring electronic parts and the like, and preventing the attraction of dust due to the electrostatic charge.

Means for Solving Problem

To solve the above-mentioned problems of the conventional art, a wheel conveyor 1 according to a first aspect of the invention comprises a frame material 4 having a substantially groove-like sectional shape, which includes an opening 3 in an upper surface portion and a wheel assembly 2 inserted and installed in a groove of the frame material 4, the wheel conveyor 1 being constructed of a plurality of wheels 5 that are rotatably supported by the wheel assembly 2 and that have outer circumferential surfaces protruding a little above the opening surface 3. The wheel 5 has an axle pin 6 that pierces the central portion of a boss to project out at both ends. Pin holes 8, into which the protruding ends of the axle pins 6 are inserted, are formed in support plates 7 arranged on both sides of the wheel 5. The wheel assembly 2 is constructed by inserting the projecting ends of the axle pins 6 in the pin holes 8 of the support plates 7 to be rotatably supported. A cross-sectional shape of the frame material 4 is so formed that the first groove-like portion 4*b* facing inward, which is formed integrally with an inward lip portion 4*a* forming the opening 3 of the upper surface portion, has substantially the same shape and size as a cross-sectional shape of the support plate 7 and supports the support plate 7 to be movable in a longitudinal direction. An inward bottom groove-like portion 4*d* formed integrally with the bottom wall 4*c* is formed to splay more than an edge of the lip portion 4*a*. Inner ends of the two groove-like portions 4*b*, 4*d* are integrally jointed to each other through a joint portion 4*e*. Accordingly, the cross-sectional shape of the frame material 4 as a whole is formed in a substantially groove-like sectional shape which includes the opening 3 in the upper surface portion and is formed into a uniform cross section in the longitudinal direction. The support plates 7 of the plurality of wheel assemblies 2 are inserted along the first groove-like portions 4*b* of the frame material 4, and the plurality of wheels 5 are arranged in line.

In a second aspect of the invention, of the wheel conveyor according to the first aspect, the wheel 5 has an axle portion 6' projecting from both ends of the central portion of the boss. The wheel assembly 2 is constructed by inserting the axle portion 6' into the pin holes 8 of the support plates 7 to be rotatably supported. The support plates 7 of the wheel assembly 2 are inserted along the first groove-like portions 4*b* of the frame material 4 to construct the wheel conveyor 1.

In a third aspect of the invention, of the wheel conveyor according to either of the first or second aspects, one or more kinds of wheel assemblies 2, which include a different number of wheels, that is, one, two, three or more wheels, constructing each of the wheel assemblies 2 and have different natural frequencies, are fitted together, and the support plate 7 of each of the wheel assemblies 2 is inserted along the respective first groove-like portion 4*b* of the frame material 4.

In a fourth aspect of the invention, of the wheel conveyor according to any one of the first through third aspects, the pin hole 8 of the support plate 7 constructing the wheel assembly 2 has a construction in which a small diameter hole 8*b* is pierced integrally with a hole portion 8*a* in which the axle pin 6 or the axle portion 6' is inserted, and a tip end of the axle pin 6 or that of the axle portion 6' is inserted no further than a step portion 8*c* between the hole portion 8*a* and the small diameter hole 8*b* and is out of contact with the frame material 4.

In a fifth aspect of the invention, of the wheel conveyor according to any one of the first through fourth aspects, a lower groove wall 4*f* of the first groove-like portion 4*b* in the frame material 4 is formed into an outward declining face, and a lower end face of the support plate 7 in the wheel assembly 2 is formed into a similar outward declining face.

In a sixth aspect of the invention, of the wheel conveyor according to any one of the first through fifth aspects, any one of the recessed portions 15, protruding portions 15, or hole portions are formed in any one of the lip portions 4*a*, longitudinal groove walls 4*g*, or lower groove walls 4*f*, which form the first groove-like portions 4*b* of the frame material 4. The support plates 7 are provided with either of the protruding portions or recessed portions 16 interfitted with any one of the recessed portions, the protruding portions 15, or the hole portions. The wheel assembly 2 is positioned by interfitting either one of the protruding portions or the recessed portions 16 of the support plates 7 with any one of the recessed portions, the protruding portions 15, or the hole portions formed in the first groove-like portions 4*b* of the frame material 4. The wheel assembly 2, in which the support plates 7 are inserted in the first groove-like portions 4*b* of the frame material 4, is set in the desired position by interfitting the protruding portions and the recessed portions 16 of the support plates 7 with any one of the recessed portions, the protruding portions or the hole portions of the first groove-like portions 4*b*, thereby performing adjustment and control of a vibration cycle as the wheel conveyor 1.

In a seventh aspect of the invention, of the wheel conveyor according to any one of the first through sixth aspects, either recessed narrow portions or protruding narrow portions 18 are formed in either or both of the bottom groove-like portions 4*d* and the joint portions 4*e* of the frame material 4, thereby performing the adjustment and control of the vibration cycle as the wheel conveyor.

In an eighth aspect of the invention, of the wheel conveyor according to any one of the first through seventh aspects, the support plates 7 of the wheel assembly 2 are made of a plastic material having an elastic modulus that is low to such a degree that a damping function is retained.

In a ninth aspect of the invention, of the wheel conveyor according to any one of the first through eighth aspects, each of the support plates 7 of the wheel assembly 2 includes in its lower portion either one of an elastic body 11 or a plastic component part 7 having a damping function.

In a tenth aspect of the invention, of the wheel conveyor according to any one of the first through seventh aspects, component parts of the wheel include a material portion 12 having an elastic modulus that is low to such a degree that a damping function is retained.

In an eleventh aspect of the invention, of the wheel conveyor according to any one of the first through tenth aspects, the wheel assembly 2 includes the wheels 5 and the support plates 7 made of a plastic material possessing either electric conductivity or an antistatic property.

In a twelfth aspect of the invention, of the wheel conveyor according to any one of the first through eleventh aspects, a dust-trapping sheet 10 that has width spanning the inside of the right and left bottom groove-like portions is laid on the bottom wall surface of the frame material 4.

Advantages of the Invention

The wheel conveyor 1 of the invention has a construction in which the support plates 7 of a plurality of the wheel assemblies 2 are inserted along the respective first groove-like portions 4*b* of the frame material 4, to thereby arrange a plurality of the wheels 5 in line; conversely, the wheel conveyor 1 can be easily disassembled by pulling the wheel assemblies 2 out from the first groove-like portions 4*b*.

In the sixth aspect of the invention, depending on the positioning of the wheel assemblies 2 inserted along the respective first groove-like portions 4*b* of the frame material 4, it is possible to easily achieve a construction in which the wheels 5 form a continuous line in large numbers with a constant pitch or a construction in which the wheels 5 form a discontinuous line with proper spaces left between the wheels 5. It is then possible to provide wheel conveyors having various construction modes according to use.

The wheel conveyor 1 of the invention is easy to clean because the frame material 4 is formed to have a substantially groove-like sectional shape which includes the opening surface 3 in the upper surface portion and is formed into a uniform cross section in the longitudinal direction. It is also possible to easily disengage the wheel assemblies 2 from the frame material 4 and disengage the wheels 5 constructing the wheel assemblies 2 from the axle pin 6 and the support plates 7. As a consequence, the wheel conveyor 1 is easy to clean and convenient for separated collection and recycling at the time of disposal.

Since the wheel conveyor 1 of the invention is not constructed such that metals are brought into direct contact and friction with each other, there is no fear of the generation of metal powder dust or the grinding noise of metal.

Moreover, the scattering of dust can be mostly suppressed by laying the dust-trapping sheet 10 on the bottom wall 4c of the frame material 4 over the bottom groove-like portions 4d, 4d located on either side. This makes the wheel conveyor 1 extremely suitable for use in an environment, such as a clean room.

The wheel conveyor 1 according to the third and sixth through tenth aspects of the invention has a buffering or damping function. Therefore, even if there are uneven places in the process of transferring items, it is unlikely that an impact would occur that could damage the items or produce a percussive noise. Consequently, the wheel conveyor 1 can be used quietly.

In the wheel conveyor 1 according to the eleventh aspect of the invention, the wheels 5 and the support plates 7 are made of a plastic material possessing electric conductivity or an antistatic property. Thus, the wheel conveyor 1 is not charged with electricity even if static electricity is created by friction or impact with the transferred items. Accordingly, there will not be a static electrical malfunction in electronic parts, and there will not be a problem of an electrostatic shock to the operator. Needless to say, there is no fear of the dust attraction and attachment caused by the electrostatic charge.

BEST MODE OF CARRYING OUT THE INVENTION

A wheel assembly 2 is prepared in which an axle pin 6 pierces a central portion of the boss of the wheel 5 to project both ends or an axle portion 6' caused to project from the central portion of both sides of the boss is inserted in each of the pin holes 8 of support plates 7, 7 arranged on both sides of the wheel 5 to be rotatably supported.

A cross-sectional shape of the frame material 4 is formed such that the first groove-like portion 4b facing inward, which is formed integrally with an inward lip portion 4a forming the opening surface 3 of the upper surface portion, has substantially the same shape and size as the cross-sectional shape of the support plate 7 and supports the support plate 7 to be movable in a longitudinal direction. An inward bottom groove-like portion 4d formed integrally with the bottom wall 4c is formed to splay more than an edge of the lip portion 4a. Inner ends of the two groove-like portions are integrally jointed to each other through a joint portion 4e. Accordingly, the cross-sectional shape of the frame material 4 as a whole is formed in a substantially groove-like sectional shape which includes the opening surface 3 in the upper surface portion, and is formed into a uniform cross section in the longitudinal direction.

The support plates 7 of the plurality of wheel assemblies 2 are inserted along the respective first groove-like portions 4b of the frame material 4, to thereby construct the wheel conveyor 1 in which the wheels 5 form a line.

Embodiment 1

The invention will be explained below with reference to embodiments shown in drawings.

FIG. 1 shows one example of an aspect of a completed wheel conveyor 1, according to the present invention. FIG. 2 shows one example of a wheel assembly 2 that constructs the wheel conveyor 1.

The wheel conveyor 1 comprises a frame material 4 having a substantially groove-like sectional shape which includes an opening 3, (see FIG. 3), in an upper surface portion and a wheel assembly 2 inserted in a groove of the frame material 4. The wheel conveyor 1 has a construction in which outer circumferential surfaces of a plurality of wheels 5 of a plurality of wheel assemblies 2 that are positioned and supported in the groove of the frame material 4 protrude a little above the opening surface 3 and are arranged in line.

The wheel 5 shown in FIGS. 4A and 5 has an axle pin 6 that is made of stainless steel and caused to pierce a central portion of a boss 5a to project both ends. Support plates 7, 7 arranged on both sides of the wheel 5 as shown in FIGS. 2 and 3 are provided with pin holes 8 in which the respective ends (projecting ends) of the axle pins 6 are inserted. In the case of FIGS. 2 and 6, two pin holes 8 are formed on a longitudinal center line of the support plate 7, leaving a space in between which is wide enough to prevent the wheels from contacting and interfering with each other. Consequently, the wheel assembly 2 shown in FIG. 2 and comprising the two wheels 5, 5 is constructed by inserting the projecting ends of the respective axle pins 6 of two wheels 5, 5 in the respective pin holes 8, 8 of the support plates 7, 7 arranged on both sides to be rotatably supported.

The axle of the wheel 5, however, is not limited to one having the construction in which the axle pin 6 made of stainless steel pierces the boss 5a as shown in FIG. 4A. As illustrated in FIG. 4B, the axle can be embodied in the same manner to have a construction including axle portions 6' that protrude from the respective central portions of both ends of the boss of the wheel 5 integrally molded from synthetic resin as an integral structure. Again, the wheel assembly 2 can be assembled by inserting the axle portions 6' into the respective pin holes 8, 8 of the support plates 7, 7 arranged on both sides of the wheel 5 to be rotatably supported, and can be applied to the wheel conveyor 1, (the second aspect of the invention).

With the above construction, if each of the support plates 7 is provided with a different number of pin holes 8, that is, one, two, three or more pin holes 8 (alternatively, the required number of pin holes 8 are preliminarily provided), the wheel assemblies 2 each having a different number of the wheels 5, that is, one, two, three or more wheels 5, can be simply and easily constructed. The wheel assemblies 2 including a different number of wheels 5 have different natural frequencies. Therefore, if a plurality of the wheel assemblies 2 including a different number of wheels 5 are combined in various ways and fit into the groove of the frame material 4, a damping function for preventing a resonance phenomenon is exhibited between the wheel assemblies 2, 2, making it possible to provide a wheel conveyor in which resonance is reduced, (the third aspect of the invention).

The pin hole 8 formed in the support plate 7 has a construction in which a small diameter hole 8b is pierced integrally with an inner hole portion 8a in which the end portion of the axle pin 6, (or the axle portion 6', and such additional reference is hereinafter intended when referring to such axle pin), is inserted, as shown in enlarged sectional view in FIG. 7. The small diameter 8b here means a hole having a diameter smaller than an external diameter of the axle pin 6. With the above construction, a tip end of the axle pin 6 is inserted no further than a step portion 8c between the hole portion 8a and the small diameter hole 8b and is never brought into contact with the frame material 4 made of metal, (the fourth aspect of the invention). For this reason, the axle pin 6 made of stainless steel and the frame material 4 made of metal are not brought into direct contact and friction with each other, so that there is no fear of the generation of metal powder dust and a grinding noise. Moreover, at the time of cleaning, since the small diameter holes 8b are pierced, it is possible to perform a cleaning similar to sweeping dust out of the holes 8b, which facilitates the cleaning.

The frame material 4 is produced from stainless steel, although it may be produced and embodied as an iron and steel article or as a synthetic resin article. As is apparent from FIG. 3, the cross-sectional shape of the frame material 4 is formed such that the first groove-like portion 4b, which is formed into an inward rectangular groove made integrally with the inward lip portion 4a forming the opening 3 of the upper surface portion, has substantially the same shape and size as the cross-sectional shape of the support plate 7 and is so formed as to tightly hold and support the support plate 7 to be movable in the longitudinal direction. The bottom groove-like portion 4d formed integrally with the bottom wall 4c in the shape of an inward rectangular groove is made to splay more than the edge of the lip portion 4a. The inner ends of the two groove-like portions 4b, 4d are integrally jointed to each other through a joint portion 4e. Accordingly, the cross-sectional shape of the frame material 4 as a whole is formed in a substantially groove-like sectional shape which includes the opening 3 in the upper surface portion, and the frame material 4 is formed to have a uniform cross section in the longitudinal direction.

The support plates 7, 7 on both the sides of the wheel assembly 2 are inserted and supported along the first groove-like portions 4b, 4b located on the right and left sides of the frame material 4. The outer circumferential surfaces of the plurality of the wheels 5 of the plurality of the wheel assemblies 2 inserted in the first groove-like portions 4b, 4b of the frame material 4 protrude a little above the opening 3 and are arranged in line, to thereby construct the wheel conveyor 1 as shown in FIG. 1.

Since the plurality of the wheel assemblies 2 are independently jointed when the wheel conveyor 1 is viewed in the longitudinal direction of the frame material 4, a buffering function is performed between the support plates 7, 7 of two adjacent wheel assemblies 2, 2, to facilitate the absorption and reduction of vibrations.

If the support plate 7 constructing each of the wheel assemblies 2 is produced from a flexible plastic material having an elastic modulus that is low, (for example, 7000 Kg/cm$^2$ or less in bending elastic modulus), to such a degree that the damping function is retained, it is possible to absorb and cushion impacts against the axle pins 6, to thereby heighten the operation and effect of absorbing the vibration of the wheels 5, (the eighth aspect of the invention).

It is also desirable, as another embodiment with a similar idea, to integrally mold the lower portion of the support plate 7 from a plastic material 7' having the damping function as illustrated in FIG. 8A or to construct the wheel assembly 2 by fixing a plate spring 11 serving as an elastic body having the damping function to the lower end surface of the support plate 7 as shown in FIG. 8B, to thereby exhibit the damping function, (the ninth aspect of the invention).

As for the construction of the wheel 5, it is also desirable that, as illustrated in FIGS. 9A and 9B, the wheel assembly 2 be constructed by using the wheel 5 constructed as a hybrid structure in which a different material 12 having an elastic modulus that is low to such a degree that the damping function is retained is included in an outer circumferential portion of a rim and a part of a hub of the wheel 5, to thereby exhibit the damping function, (the tenth aspect of the invention).

Since the wheel conveyor 1 of the invention is constructed as described above, an embodiment in which resin-made portions other than the axle pins 6 of the wheels 5 constructing the wheel assemblies 2 and the support plates 7 made of synthetic resin are each produced from a plastic material possessing electric conductivity or an antistatic property may also be preferred. According to the above construction, even if static electricity is generated due to friction and impact with the transferred items, the static electricity is instantly drained off (grounded) via the frame material 4 and the axle pins 6, which are grounded, to prevent an electrical charge because of the electric conductivity. Consequently, there is no fear of malfunction or damage attributable to static electricity even if the transferred items are electronic parts. Needless to say, the problem of an operator engaged in the transfer operation getting an electrostatic shock is also prevented, (the eleventh aspect of the invention). The problem of dust attraction and attachment caused by the electrostatic charge is also resolved.

The wheel conveyor 1 of the invention may be embodied by laying a dust-trapping sheet 10 made of a wide non-woven fabric that stretches over the right and left bottom groove-like portions 4d, 4d on the surface of the bottom wall 4c of the frame material 4, (the twelfth aspect of the invention). Such an embodiment makes it possible to securely trap and fix the dust that falls during the operation of the conveyor or the like with the dust-trapping sheet 10, which is sufficiently wider than an internal dimension of the lip portion 4a and the joint portion 4e of the frame material 4, thereby greatly preventing the dust from scattering. Therefore, the wheel conveyor 1 is suitable for use in a clean room. One advantage of this is that maintenance, including the cleaning and the like, can be easily and quickly performed by exchanging the dust-trapping sheet 10.

The wheel conveyor 1 of the invention can be easily achieved in an embodiment with a construction in which the wheels 5 are divided into discontinuous groups to form a line by arranging two adjacent wheel assemblies 2, 2 with a slightly wide space left in between, the wheel assembly 2 being constructed of two, three or four wheels 5, 5 as a unit as shown in FIGS. 11 through 13, according to the character, shape, and other conditions of the transferred article 13, in addition to the embodiment with the construction in which the wheels 5 form a line with a tight and constant pitch in the longitudinal direction of the frame material 4 as shown in FIGS. 1 and 10.

To that end, the facility and reliability of the positioning of each of the wheel assemblies 2 in the longitudinal direction of the frame material 4 are required.

In order to satisfy the above requirements, the lip portions 4a forming the first groove-like portions 4b in the frame material 4 shown in FIG. 14 are provided with protruding portions 15, (or recessed portions that dent reversely or hole portions), that protrude into the grooves. In FIG. 15, longitudinal groove walls 4g forming the same first groove-like portions 4b are provided with the protruding portions 15 (or recessed portions that dent reversely or hole portions, and such additional reference is hereinafter intended when referring to such protruding portions), that protrude into the grooves. FIG. 16 shows an embodiment in which lower groove walls 4f forming the first groove-like portions 4b are provided with the protruding portions 15 that protrude into the grooves. Needless to say, the protruding portions 15 may be formed in the lip portions 4a, the longitudinal groove walls 4g, and the lower groove walls 4f forming the first groove-like portions 4b of the frame material 4, respectively.

At the same time, recessed portions 16 which have a shape and size substantially identical to one another and can be interfitted with the protruding portions 15 to be surely positioned and fixed are formed in upper and lower end faces, (or either required one), of the support plate 7 that constructs the wheel assembly 2 used for the frame material 4 of FIGS. 14 and 16 with the same pitch as illustrated in FIG. 17. In addition, if recessed portions 17 (or protruding portions that project reversely), which have a shape and size substantially identical to one another and can be interfitted with the protruding portions 15 to be securely positioned and fixed are formed on the outer surface of the support plate 7 constructing the wheel assembly 2 used for the frame material 4 of FIG. 15 with the same pitch as shown in FIGS. 18A and 18B, this improves the facility and reliability of the positioning and fixation for each of the wheel assemblies 2 in the longitudinal direction of the frame material 4, and the wheel conveyor 1 shown in FIGS. 10 through 13 can be easily and securely produced, thus being convenient, (the sixth aspect of the invention).

If the protruding portions 15, (or recessed portions that dent reversely), are provided in each component part, (each wall surface portion), of the frame material as described, the rigidity of the frame material 4 is thereby heightened. As a result, vibration does not occur as easily, and the natural frequency is changed. If the wheel conveyor is assembled based on the above concept, by using the frame material 4 in which protruding narrow portions 18 (or recessed portions that dent reversely) are formed in either or both of longitudinal groove walls 4h forming the bottom groove-like portions 4d of the frame material 4 and the joint portions 4e as shown in FIG. 19, the adjustment and control of a vibration cycle can be properly carried out, thus being convenient, (the seventh aspect of the invention).

It is known that if the weight of the transferred items is loaded when the wheel conveyor 1 is in use, the load acts intensively upon the lower groove walls 4f of the first groove-like portions 4b in the frame material 4 through the support plates 7, and the groove walls generate vibration in inward and outward directions. As a countermeasure, FIG. 20 shows an embodiment in which the lower groove walls 4f of the first groove-like portions 4b of the frame material 4 are formed into outward declining faces, and correspondingly the lower end faces of the support plates 7 of the wheel assembly 2 are formed into similar outward declining faces, (the fifth aspect of the invention).

According to the above construction, when the weight of the transferred items is loaded, the load creates an inward component force due to the outward declining faces of the lower groove walls 4f of the first groove-like portions 4b and those of the support plates 7. This produces the effect of suppressing and preventing the inward and outward vibration of the groove walls, which makes it possible to provide a wheel conveyor 1 that generates only slight vibrations.

Lastly, different examples of construction and use for the wheel assembly 2 are described below.

FIGS. 21A and 21B show embodiments in which the wheel 5 is formed into an elongated roller, and the support plates 7 for supporting both sides are formed into a groove-like shape by integrally joining the lower end portions to each other through a bottom plate 20. FIG. 21A shows an example of a construction in which the bottom plate 20 is divided into halves at a central portion, and the divided surfaces are integrally coupled to each other with, for example, coupling pins 21. FIG. 21B on the other hand shows an example of a construction in which the bottom plate 20 is integrally molded with the support plates 7, 7 on both sides. These wheel assemblies 2 each have a construction in which the axle pins or axle portions of the wheels are rotatably supported in the pin holes of the support plates 7 arranged on both sides of the wheels 5. These wheel assemblies 2 are used for the construction of the wheel conveyor 1 by inserting the support plates 7, 7 located on both sides into the first groove-like portions 4b, 4b of the frame material 4 in the same manner as the above-mentioned embodiments.

The wheel assembly 2 of the present embodiment, however, may be used as a conveyor utilized for directly transferring items if the bottom plate 20 is placed by itself or if a plurality of bottom plates 20 are aligned in a row, on a stand, such as given table and bench as illustrated in FIG. 22.

Although the present invention has been explained on the basis of the embodiments shown in the drawings, it should be noted that the invention is not limited to the embodiments shown in the drawings. The invention may be embodied in various modes to the extent of design changes and applications that one skilled in the art generally makes.

Figure 1:
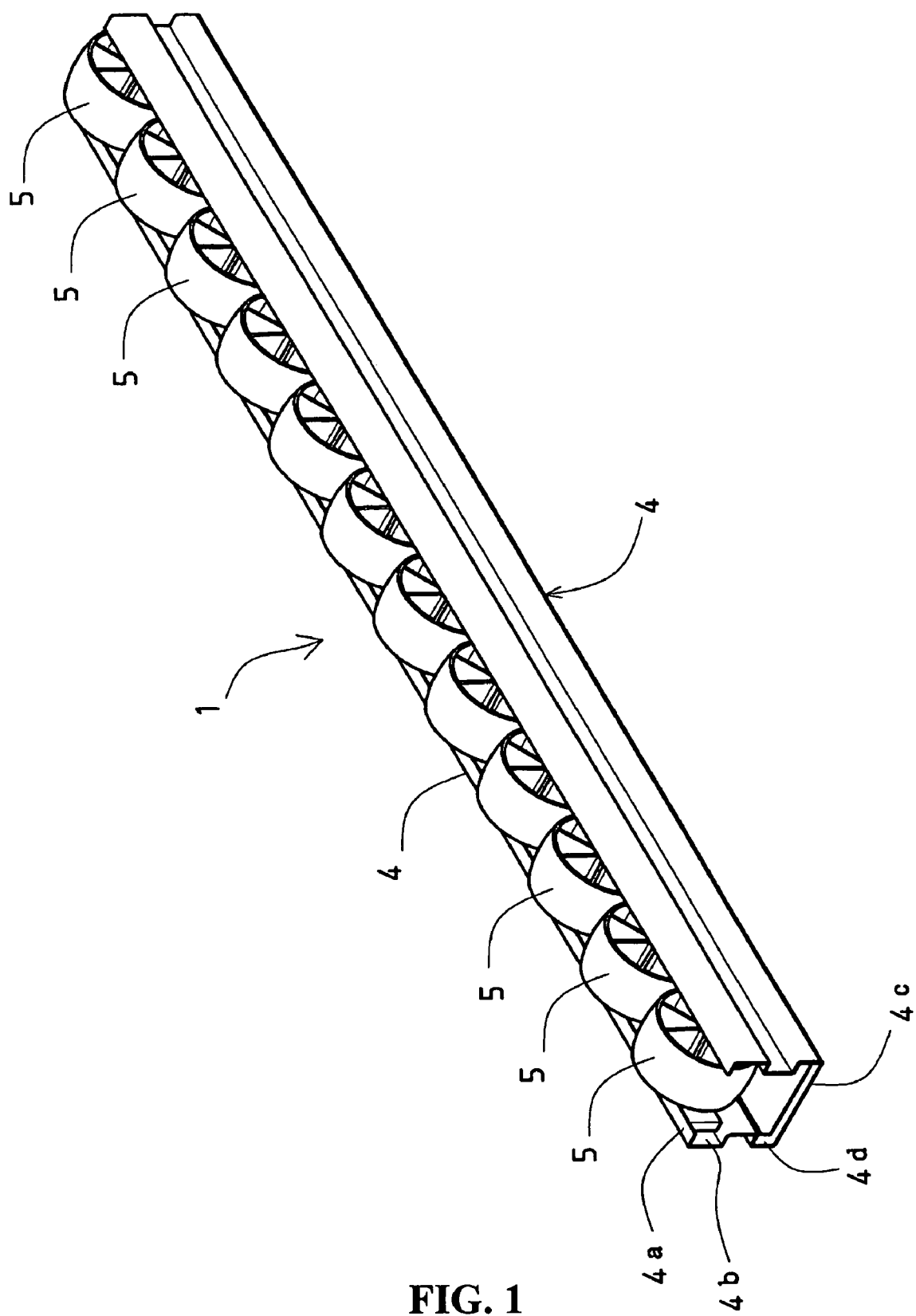
FIG. 1 is a perspective view showing an embodiment of a wheel conveyor according to the present invention.
Figure 2:
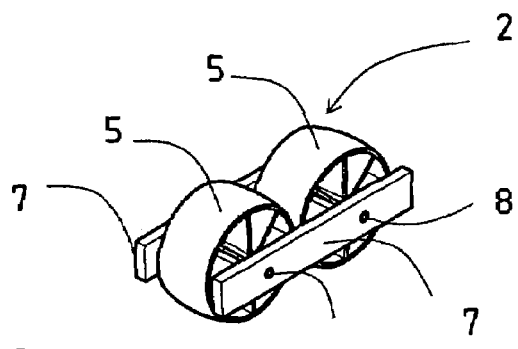
FIG. 2 is a perspective view showing one example of a wheel assembly applied to the wheel conveyor of the present invention.
Figure 3:
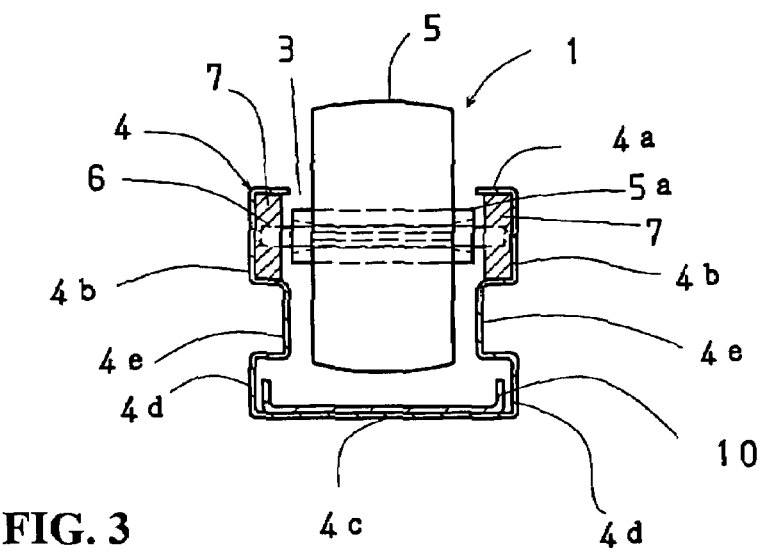
FIG. 3 is a cross-sectional view of the wheel conveyor according to the present invention.
Figure 4:
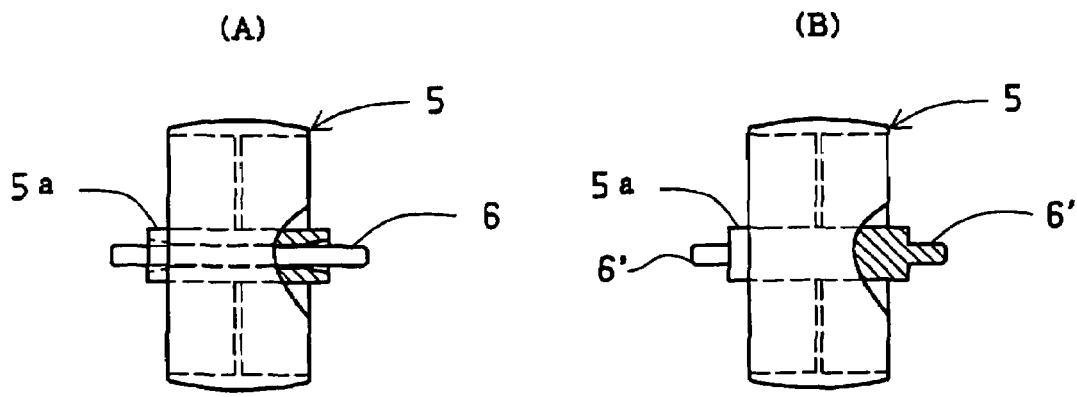
FIGS. 4A and 4B are front views showing wheels having different axle portions, partially broken away.
Figure 5:
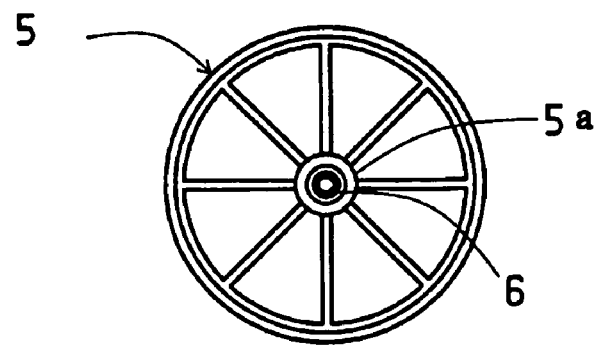
FIG. 5 is a side view of the wheel.
Figure 6:
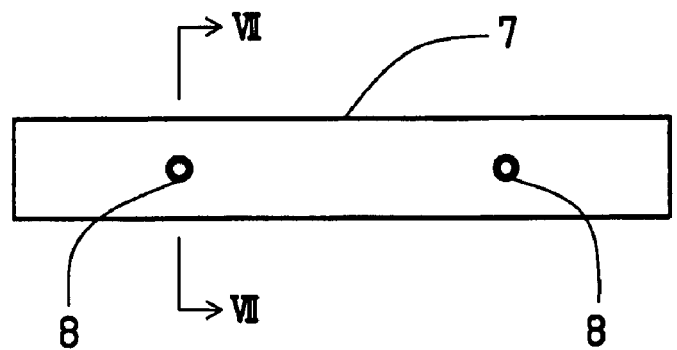
FIG. 6 is a front view showing one example of a support plate.
Figure 7:
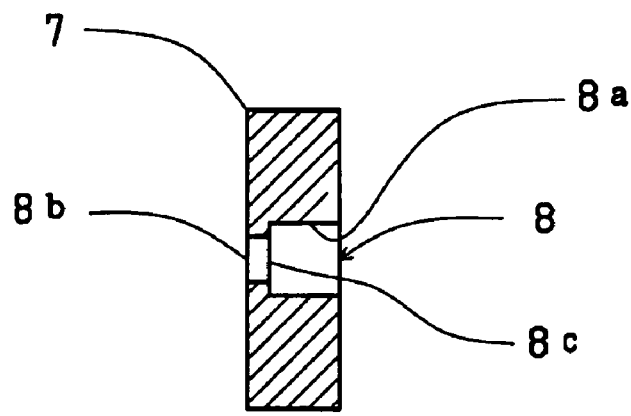
FIG. 7 is an enlarged sectional view, taken along line VII-VII of FIG. 6.
Figure 8:
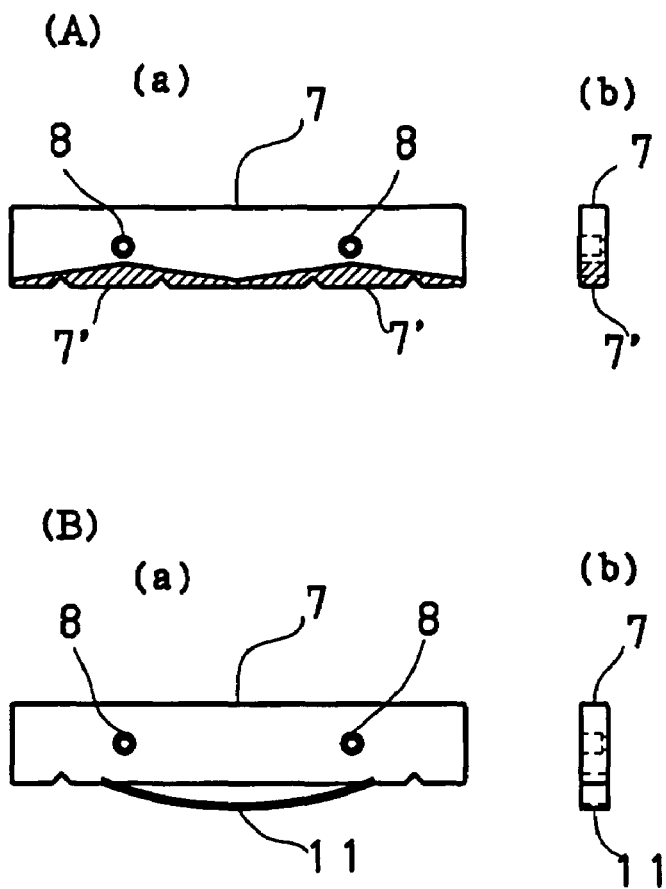
FIGS. 8A and 8B are a front and a side view, respectively, showing different examples of construction of a support plate.
Figure 9:
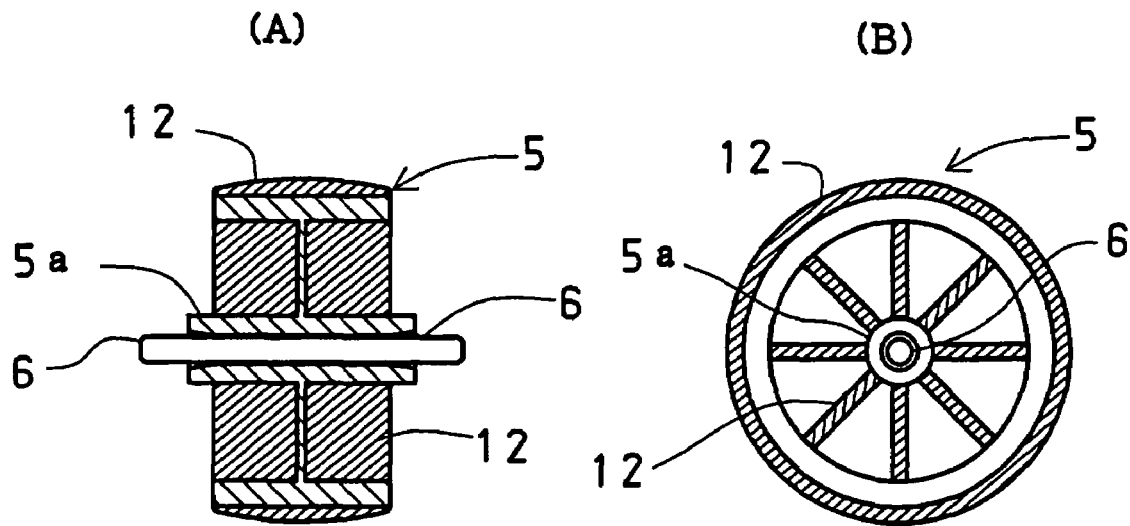
FIGS. 9A and 9B are a front sectional view, respectively, and a side view showing different examples of construction of the wheel.
Figure 10:
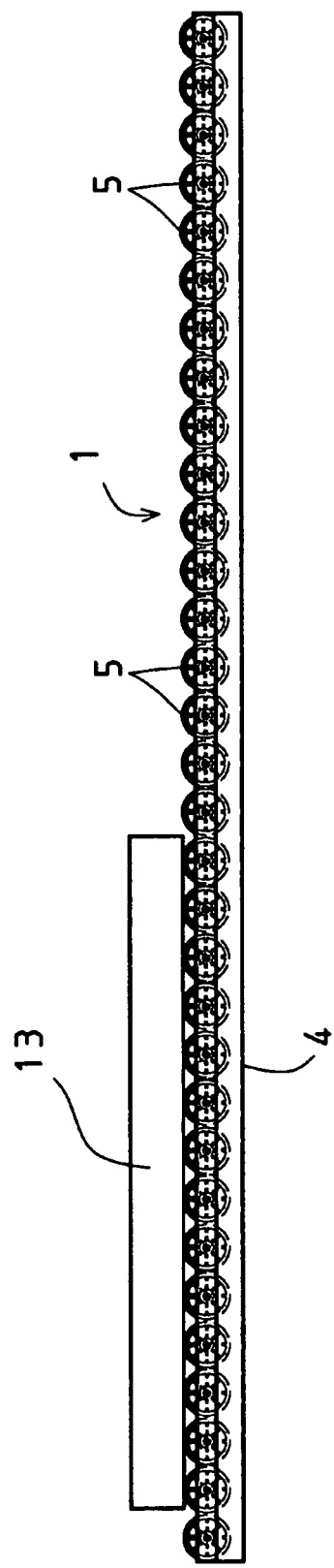
FIG. 10 is a front view showing an embodiment of the wheel conveyor according to the present invention.
Figure 11:
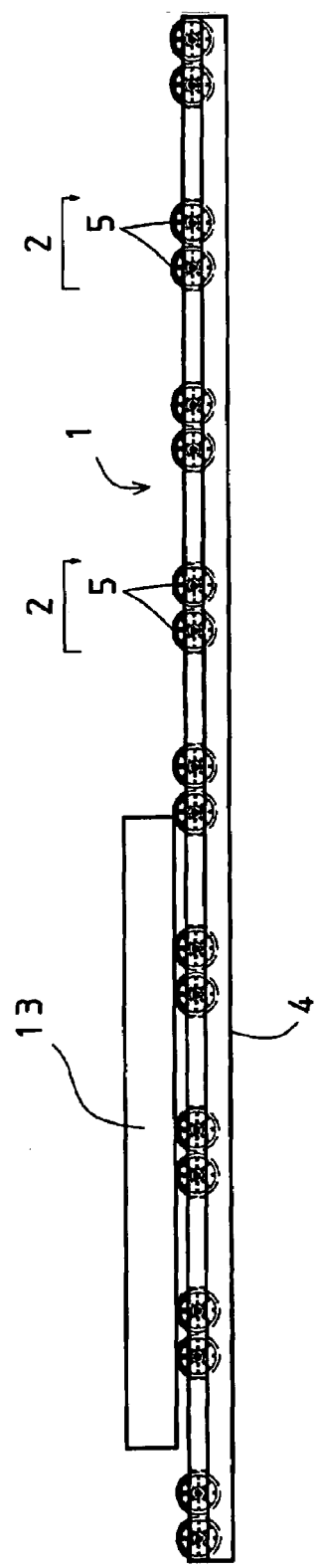
FIG. 11 is a front view showing another embodiment of the wheel conveyor according to the present invention.
Figure 12:
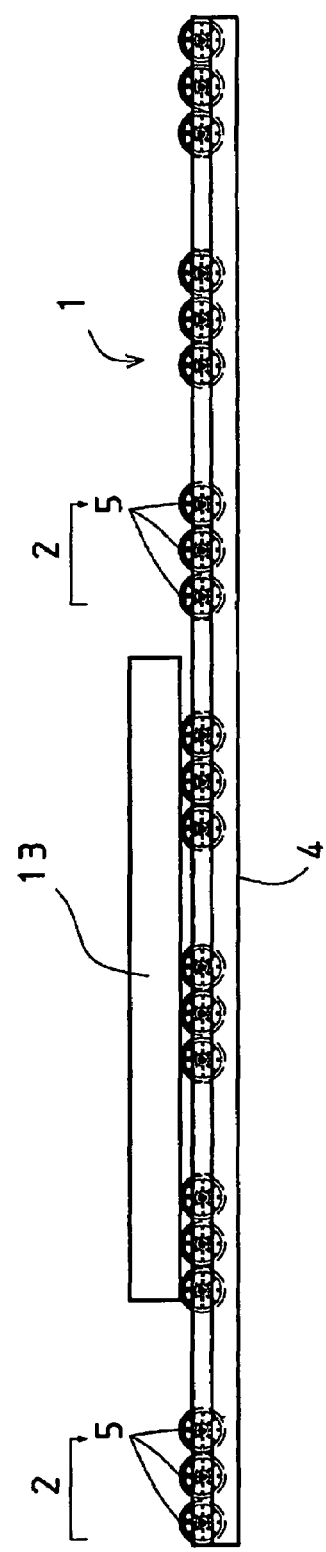
FIG. 12 is a front view showing another embodiment of the wheel conveyor according to the present invention.
Figure 13:
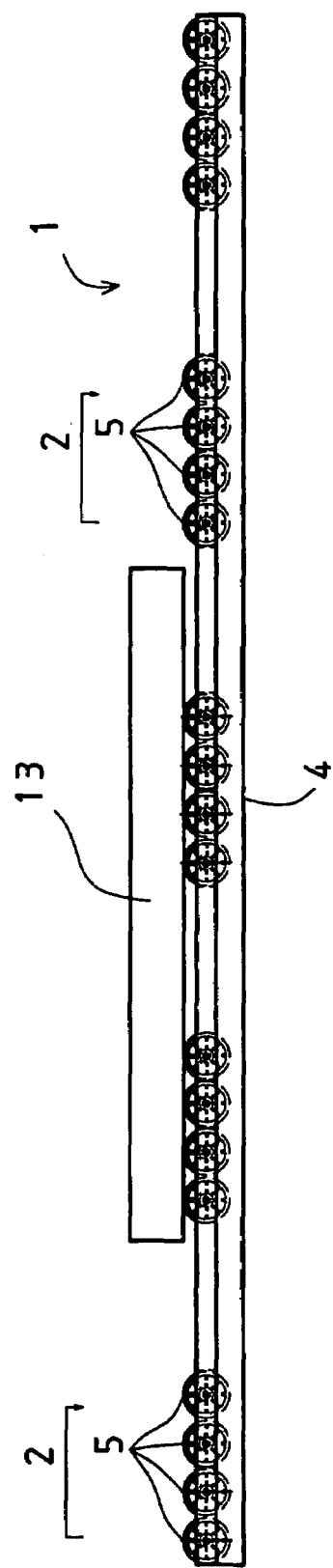
FIG. 13 is a front view showing another embodiment of the wheel conveyor according to the present invention.
Figure 14:
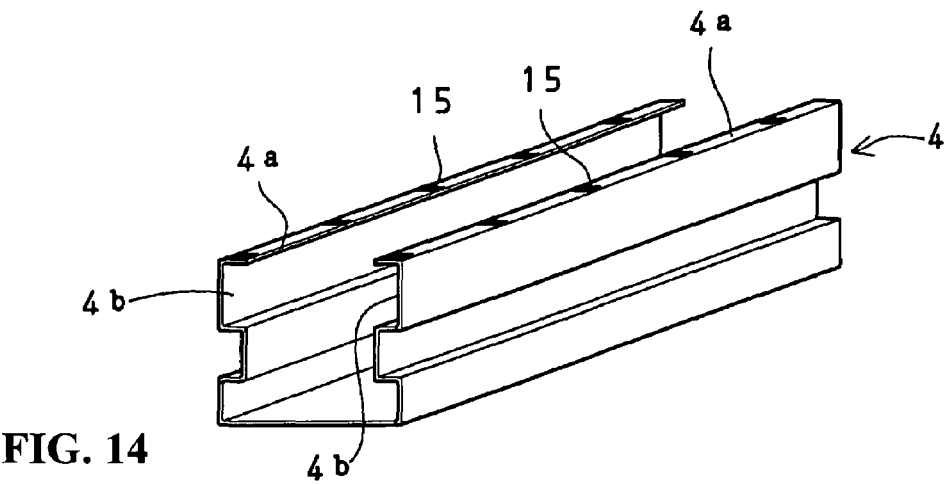
FIG. 14 is a perspective view showing another embodiment of a frame material.
Figure 15:
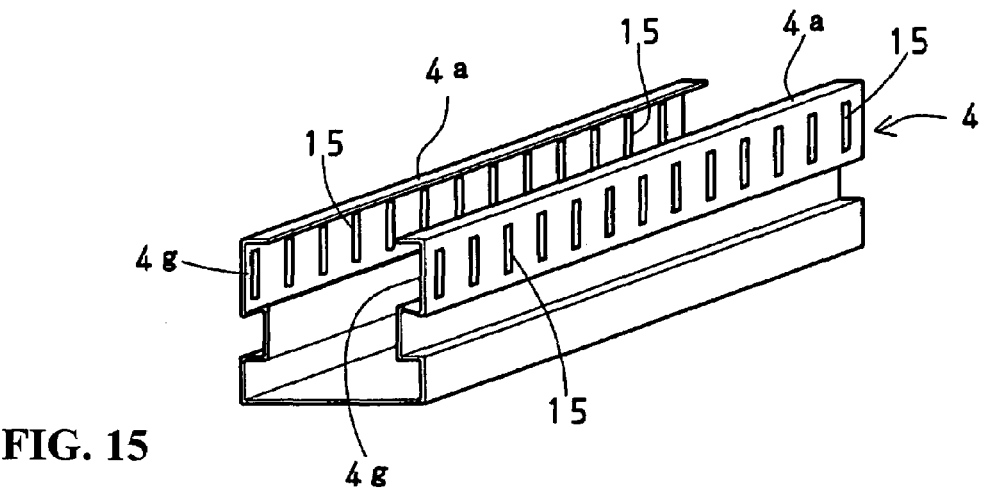
FIG. 15 is a perspective view showing another embodiment of the frame material.
Figure 16:
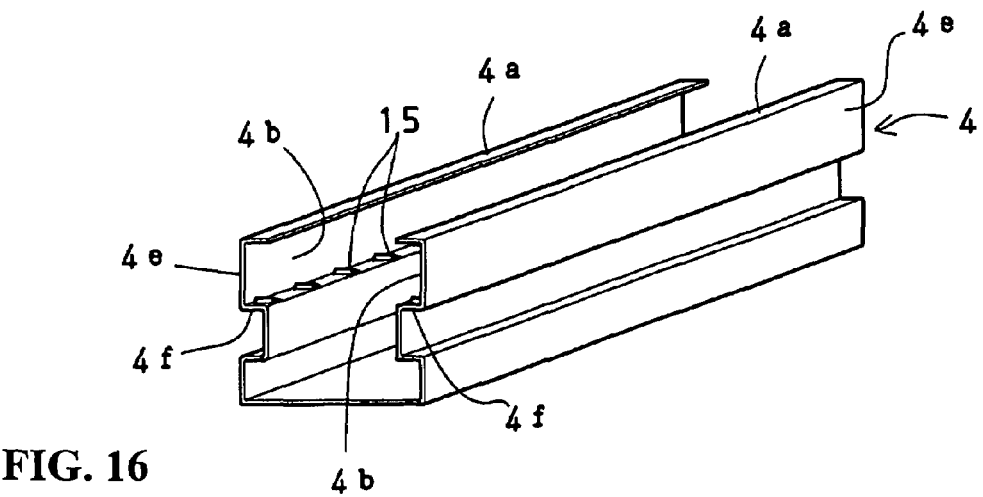
FIG. 16 is a perspective view showing another embodiment of the frame material.
Figure 17:
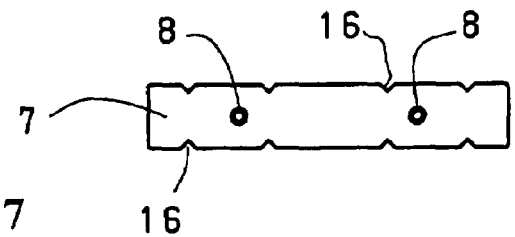
FIG. 17 is a front view showing another embodiment of the support plate.
Figure 18:
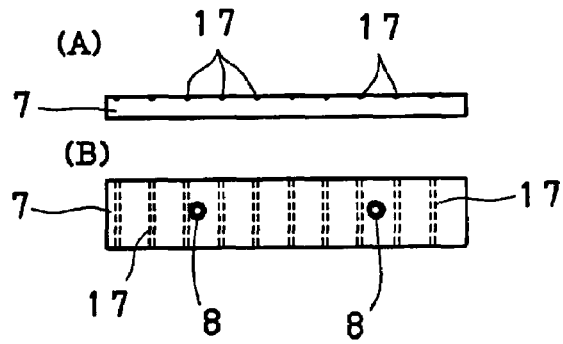
FIGS. 18A and 18B are a plan and a front view, respectively, showing another embodiment of the support plate.
Figure 19:
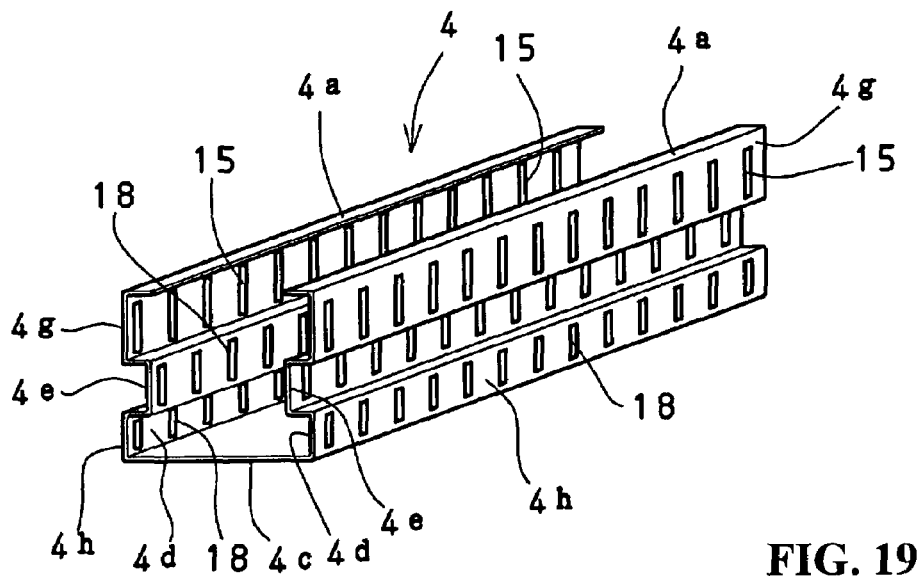
FIG. 19 is a perspective view showing another embodiment of the frame material.
Figure 20:
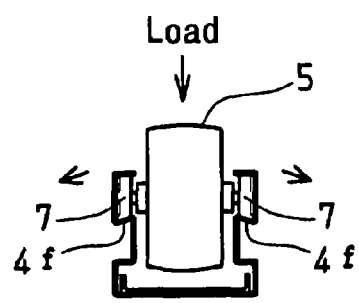
FIG. 20 is a cross-sectional view showing another embodiment of the wheel conveyor according to the present invention.
Figure 21:
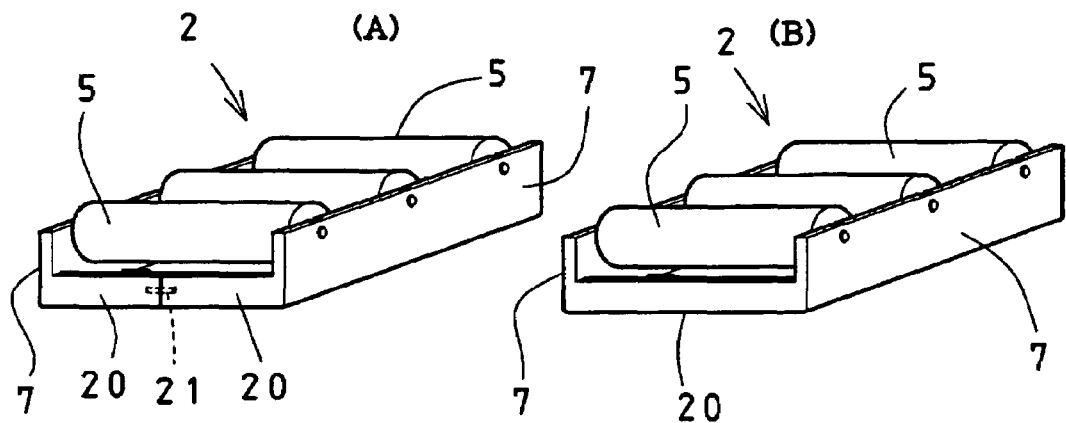
FIGS. 21A and 21B are perspective views showing different embodiments of the wheel assembly.
Figure 22:
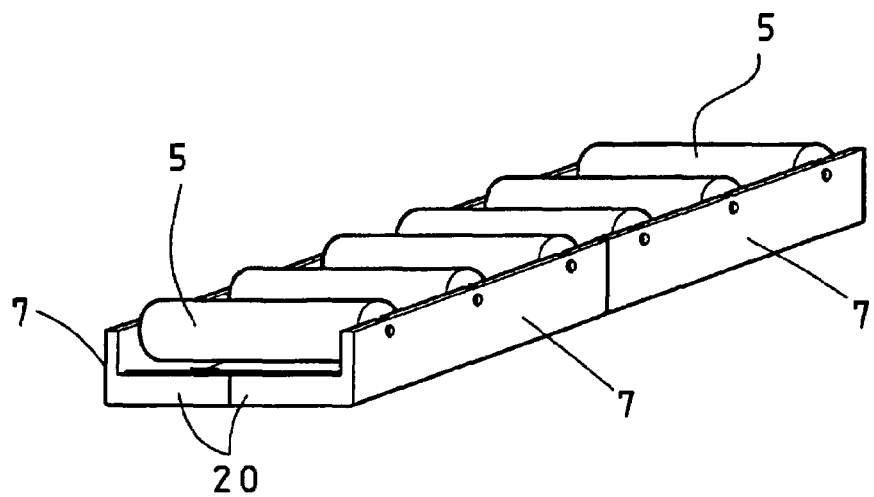
FIG. 22 is a perspective view showing an example of use of the wheel assembly.

EXPLANATION OF REFERENCE NUMERALS 1 wheel conveyor
3 opening surface
4 frame material
5 wheel
5a boss
6 axle pin
7 support plate
8 pin hole
2 wheel assembly
4a lip
4b first groove-like portion
4c bottom wall
4d bottom groove-like portion
4e joint portion
8a hole portion
8b small diameter hole
10 dust-trapping sheet
4g longitudinal groove wall
4f lower groove wall
6' axle portion
15 protruding portion
16 recessed portion
18 protruding narrow portion
11 elastic body

The invention claimed is:

1. A wheel conveyor comprising a frame material having a substantially groove-like sectional shape which includes an opening in an upper surface portion thereof and a wheel assembly inserted and installed in a groove of said frame material, said wheel conveyor being constructed of a plurality of wheels that are rotatably supported by said wheel assembly and have outer circumferential surfaces protruding a little above an opening surface, wherein:

a wheel has an axle pin caused to pierce a central portion of a boss thereof to project from both ends, pin holes into which projecting ends of said axle pin are inserted are formed in support plates arranged on both sides of said wheel, and said wheel assembly is constructed by inserting said projecting ends of said axle pin into said pin holes of said support plates to be rotatably supported; wherein:

a cross-sectional shape of said frame material is formed such that a first groove-like portion facing inward, which is formed integrally with an inward lip portion forming an opening of an upper surface portion, has substantially the same shape and size as a cross-sectional shape of said support plate and supports said support plate to be movable in a longitudinal direction, an inward bottom groove-like portion formed integrally with a bottom wall is formed to splay more than an edge of said lip portion, and inner ends of said two groove-like portions are integrally jointed to each other through a joint portion, and the cross-sectional shape of said support plate as a whole is formed in a substantially groove-like shape which includes an opening in an upper surface portion and formed into a uniform cross section in a longitudinal direction; and wherein:

said support plates of a plurality of said wheel assemblies are inserted along a first groove-like portions of said frame material, and a plurality of said wheels are arranged in line, wherein a dust-trapping sheet that has a width spanning an inside of the right and left bottom groove-like portions is laid on said bottom wall surface of said frame material.

2. The wheel conveyor according to claim 1, wherein each of said wheels has an axle portion caused to project from both ends of said central portion of said boss, said wheel assembly is constructed by inserting said axle portion into said pin holes of said support plates to be rotatably supported, and said support plates of said wheel assembly are inserted along said first groove-like portions of the frame material to construct said wheel conveyor.

3. The wheel conveyor according to claim 2, wherein one or more kinds of said wheel assemblies, which include a different number of wheels, that is, one, two, three or more wheels, constructing each of said wheel assemblies and have different natural frequencies, are fitted together, and said support plates of said wheel assembly are inserted along said first groove-like portions of said frame material.

4. The wheel conveyor according to claim 2, wherein said pin holes of said support plates constructing said wheel assembly are formed such that small diameter holes are pierced integrally with hole portions into which axle pins or axle portions are inserted, and tip ends of said axle pins or of said axle portions are inserted no further than step portions between said respective hole portions and said respective small diameter holes and are out of contact with said frame material.

5. The wheel conveyor according to claim 2, wherein lower groove walls of said first groove-like portions in said frame material are formed into outward declining faces, and lower end faces of said support plates in said wheel assembly are formed into similar outward declining faces.

6. The wheel conveyor according to claim 2, wherein any one of recessed portions, protruding portions, and hole portions are formed in any one of said lip portions, longitudinal groove walls, and lower groove walls, which form the first groove-like portions of said frame material, said support plates are provided with either one of protruding portions or recessed portions interfitted with any one of said recessed portions, said protruding portions or said hole portions, and said wheel assembly is positioned by interfitting either one of said protruding portions or said recessed portions of said support plates with any one of said recessed portions, said protruding portions or said hole portions formed in said first groove-like portions of said frame material; and wherein:

the wheel assembly in which said support plates are inserted in said first groove-like portions said frame material is set in a desired position by interfitting said protruding portions and said recessed portions of said support plates with any one of said recessed portions, said protruding portions or said hole portions of said first groove-like portions, thereby performing adjustment and control of a vibration cycle of said wheel conveyor.

7. The wheel conveyor according to claim 1, wherein one or more kinds of said wheel assemblies, which include a different number of wheels, that is, one, two, three or more wheels, constructing each of said wheel assemblies and have different natural frequencies, are fitted together, and said support plates of said wheel assembly are inserted along said first groove-like portions of said frame material.

8. The wheel conveyor according to claim 7, wherein said pin holes of said support plates constructing said wheel assembly are formed such that small diameter holes are pierced integrally with hole portions into which axle pins or axle portions are inserted, and tip ends of said axle pins or of said axle portions are inserted no further than step portions between said respective hole portions and said respective small diameter holes and are out of contact with said frame material.

9. The wheel conveyor according to claim 7, wherein lower groove walls of said first groove-like portions in said frame material are formed into outward declining faces, and lower end faces of said support plates in said wheel assembly are formed into similar outward declining faces.

10. The wheel conveyor according to claim 7, wherein any one of recessed portions, protruding portions, and hole portions are formed in any one of said lip portions, longitudinal groove walls, and lower groove walls, which form the first groove-like portions of said frame material, said support plates are provided with either one of protruding portions or recessed portions interfitted with any one of said recessed portions, said protruding portions or said hole portions, and said wheel assembly is positioned by interfitting either one of said protruding portions or said recessed portions of said support plates with any one of said recessed portions, said protruding portions or said hole portions formed in said first groove-like portions of said frame material; and wherein:

the wheel assembly in which said support plates are inserted in said first groove-like portions said frame material is set in a desired position by interfitting said protruding portions and said recessed portions of said support plates with any one of said recessed portions, said protruding portions or said hole portions of said first groove-like portions, thereby performing adjustment and control of a vibration cycle of said wheel conveyor.

11. The wheel conveyor according to claim 1, wherein said pin holes of said support plates constructing said wheel assembly are formed such that small diameter holes are pierced integrally with hole portions into which axle pins or axle portions are inserted, and tip ends of said axle pins or of said axle portions are inserted no further than step portions between said respective hole portions and said respective small diameter holes and are out of contact with said frame material.

12. The wheel conveyor according to claim 11, wherein lower groove walls of said first groove-like portions in said frame material are formed into outward declining faces, and lower end faces of said support plates in said wheel assembly are formed into similar outward declining faces.

13. The wheel conveyor according to claim 1, wherein lower groove walls of said first groove-like portions in said frame material are formed into outward declining faces, and lower end faces of said support plates in said wheel assembly are formed into similar outward declining faces.

14. The wheel conveyor according to claim 1, wherein any one of recessed portions, protruding portions, and hole portions are formed in any one of said lip portions, longitudinal groove walls, and lower groove walls, which form the first groove-like portions of said frame material, said support plates are provided with either one of protruding portions or recessed portions interfitted with any one of said recessed portions, said protruding portions or said hole portions, and said wheel assembly is positioned by interfitting either one of said protruding portions or said recessed portions of said support plates with any one of said recessed portions, said protruding portions or said hole portions formed in said first groove-like portions of said frame material; and wherein:

the wheel assembly in which said support plates are inserted in said first groove-like portions said frame material is set in a desired position by interfitting said protruding portions and said recessed portions of said support plates with any one of said recessed portions, said protruding portions or said hole portions of said first groove-like portions, thereby performing adjustment and control of a vibration cycle of said wheel conveyor.

15. The wheel conveyor according to, wherein either one of recessed narrow portions and protruding narrow portions are formed in either or both of said bottom groove-like portions and said joint portions of said frame material, thereby performing adjustment and control of said vibration cycle as said wheel conveyor.

16. The wheel conveyor according to claim 1, wherein said support plates of said wheel assembly are made of a plastic material having an elastic modulus that is low to such a degree that a damping function is retained.

17. The wheel conveyor according to claim 1, wherein each of said support plates of said wheel assembly includes in a lower portion thereof either one of an elastic body or a plastic component part having a damping function.

18. The wheel conveyor according to claim 1, wherein component parts of said wheel include a material portion having an elastic modulus that is low to such a degree that a damping function is retained.

19. The wheel conveyor according to claim 1, wherein said wheel assembly includes said wheels and said support plates made of a plastic material possessing either one of electric conductivity or an antistatic property.

* * * * *